Oct. 11, 1938.  R. R. HUNT  2,132,788
METHOD OF AND APPARATUS FOR MAKING RUBBER HEELS AND THE LIKE
Filed Dec. 30, 1935  7 Sheets-Sheet 1

Inventor:
Ray R. Hunt
By Eugene M. Giles
Atty.

Oct. 11, 1938.  R. R. HUNT  2,132,788
METHOD OF AND APPARATUS FOR MAKING RUBBER HEELS AND THE LIKE
Filed Dec. 30, 1935  7 Sheets-Sheet 2

Inventor:
Ray R. Hunt
By Eugene M. Giles
Atty.

Oct. 11, 1938.   R. R. HUNT   2,132,788
METHOD OF AND APPARATUS FOR MAKING RUBBER HEELS AND THE LIKE
Filed Dec. 30, 1935   7 Sheets-Sheet 3

Inventor:
Ray R. Hunt
By Eugene M. Giles Atty.

Oct. 11, 1938.  R. R. HUNT  2,132,788
METHOD OF AND APPARATUS FOR MAKING RUBBER HEELS AND THE LIKE
Filed Dec. 30, 1935  7 Sheets-Sheet 5

Inventor
Ray R. Hunt
By Eugene M. Giles
Atty.

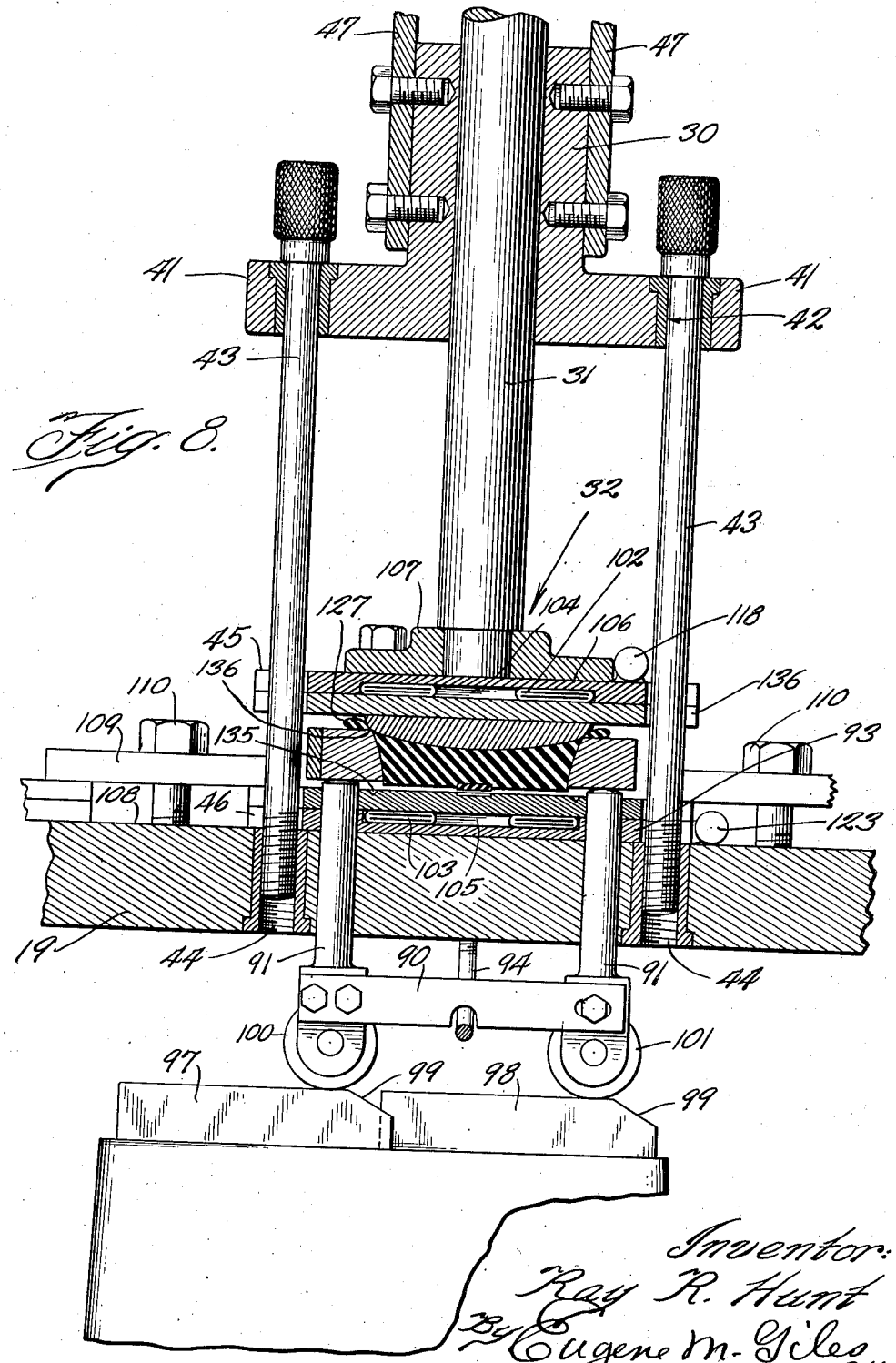

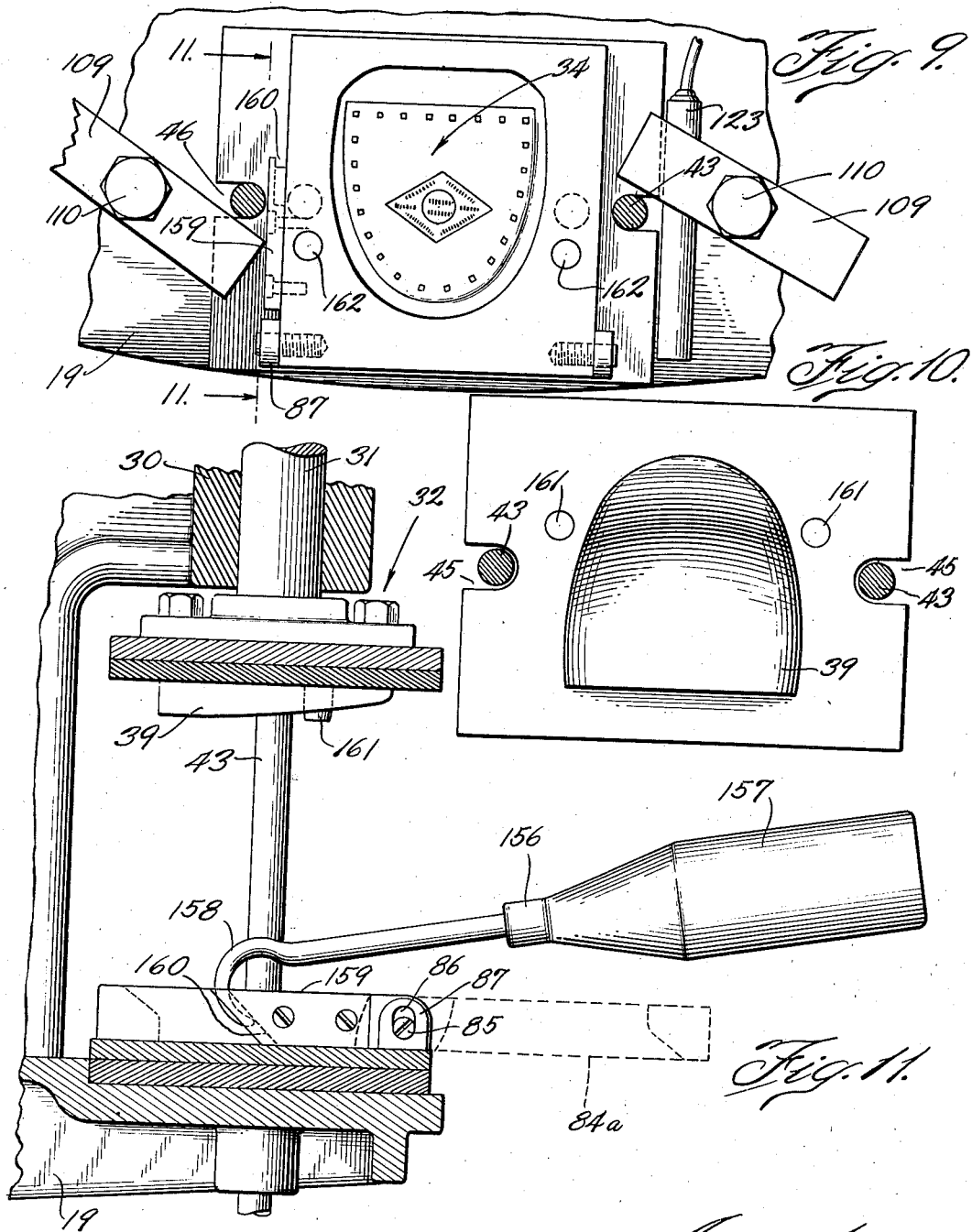

Patented Oct. 11, 1938

2,132,788

UNITED STATES PATENT OFFICE 2,132,788

METHOD OF AND APPARATUS FOR MAKING RUBBER HEELS AND THE LIKE

Ray R. Hunt, Mishawaka, Ind., assignor to Mishawaka Rubber and Woolen Manufacturing Company, Mishawaka, Ind., a corporation of Indiana Application December 30, 1935, Serial No. 56,629

10 Claims. (Cl. 18—20)

My invention relates to a method of and apparatus for molding articles such as rubber heels and includes facilities for trimming the articles.

The principal objects of my invention are to simplify and facilitate the manufacture of molded articles such as rubber heels; to permit such articles to be produced substantially continuously and automatically in the final form as required for use; to provide facilities for effectively trimming off surplus material from the molded article in an improved manner; to insure accuracy of adjustment and operation of the forming and trimming parts; to simplify and expedite removal of the completed article from the mold; and to construct and arrange the mold so that the mold cavity is readily accessible for filling and for removing the completed article therefrom,—these and other objects being accomplished with the present invention as described hereinafter, reference being had to the accompanying drawings in which,—

Fig. 8 is a view similar to Fig. 7 but with additional parts all shown in the position for trimming the molded article;

Fig. 9 is a top plan section of the mold taken on the line 9—9 of Fig. 6;

Fig. 10 is a section taken substantially on the line 10—10 of Fig. 7 and looking upwardly at the under side of the movable top plate of the mold; and Fig. 11 is a detail vertical section taken on the line 11—11 of Fig. 9 and shows the manner in which the mold is operated to remove the molded article.

Figures 1, 2:
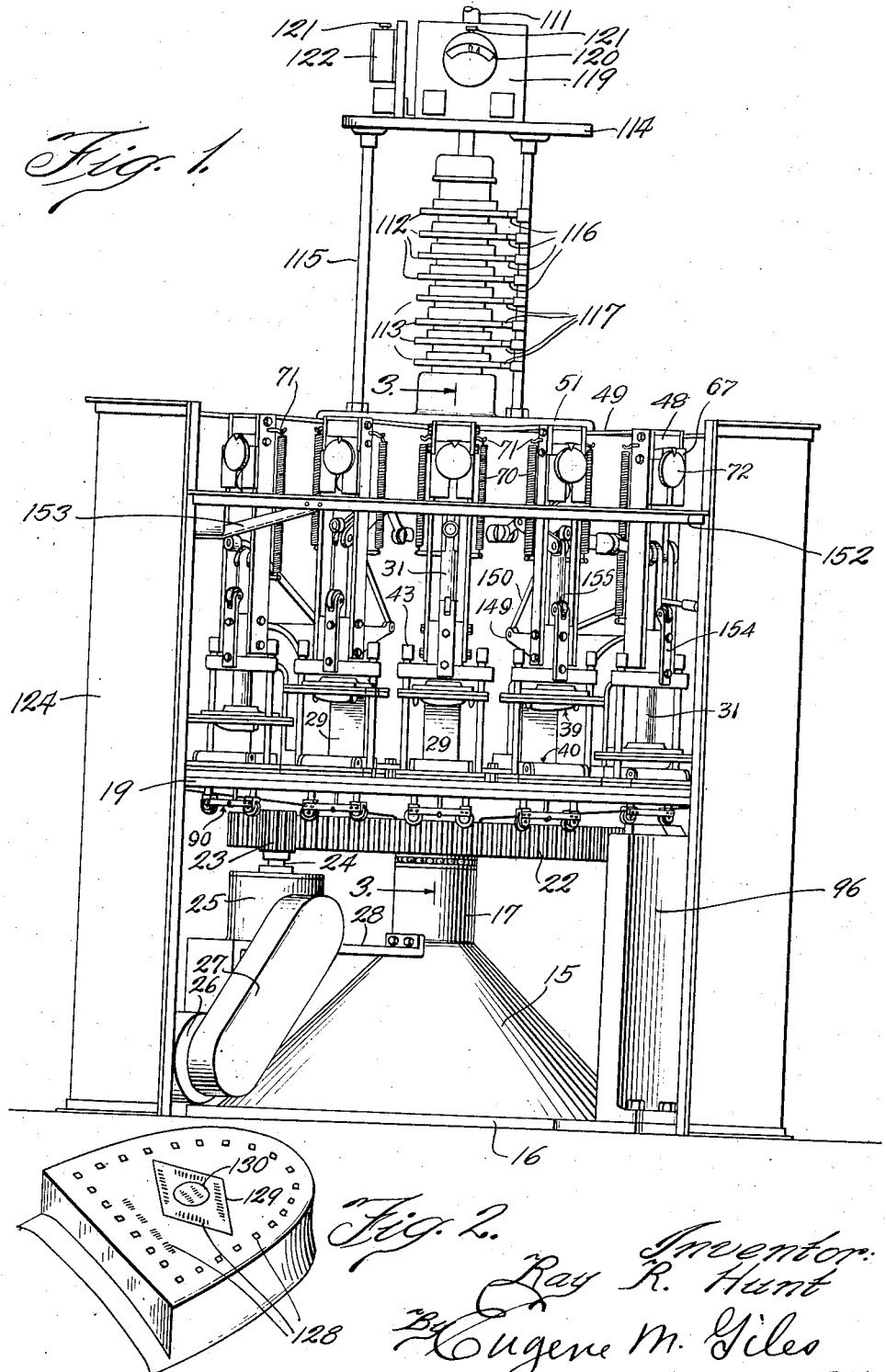
Fig. 1 is a front elevation of the preferred embodiment of this invention as viewed from the operator's station.
Fig. 2 is a perspective view of a finished heel which the illustrated machine is designed to make.

Referring to the drawings which show a machine for making rubber heels, although it is to be understood that my invention is not necessarily limited thereto, the reference numeral 15 indicates the machine base which is of conical form with a bottom marginal flange 16 and a central elevated hub 17 in which the lower end of the vertical shaft or spindle 18 is fixedly secured. A circular table 19 is mounted to rotate on the shaft or spindle 18 and has a hub 20 embracing said spindle and resting on an anti-friction bearing 21 which in turn rests upon the top of the hub portion 17 of the base and permits the table to rotate freely around the shaft or spindle 18.

A large spur gear 22 is fixed on the table hub 20 underneath the table and meshes with a pinion 23 on the upper end of the vertical shaft 24 of a reduction gear 25 which is operated from a motor 26 through a variable speed transmission 27 which may be adjusted to regulate the speed at which the table 19 is rotated. The reduction gear 25, transmission 27 and motor 26 which are mounted together with a bracket 28 on the machine base 15 are not shown in detail as they are conventional devices such as are commonly employed for supplying and transmitting power at a regulatable reduced speed.

Figure 3:
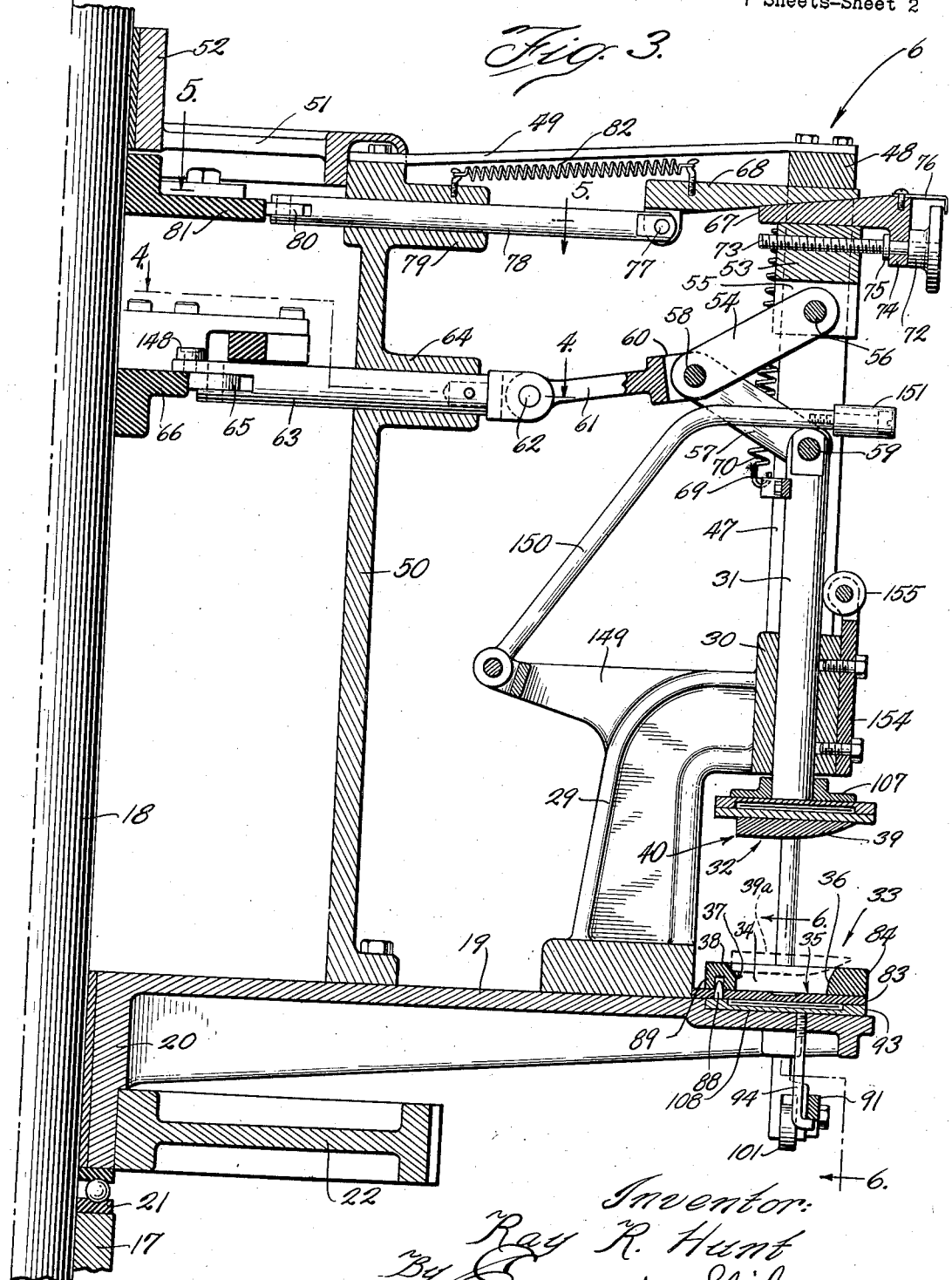
Fig. 3 is a fragmentary vertical section taken on the line 3—3 of Fig. 1 and showing the various parts in the position that they assume at the operator's station.
Figure 7:
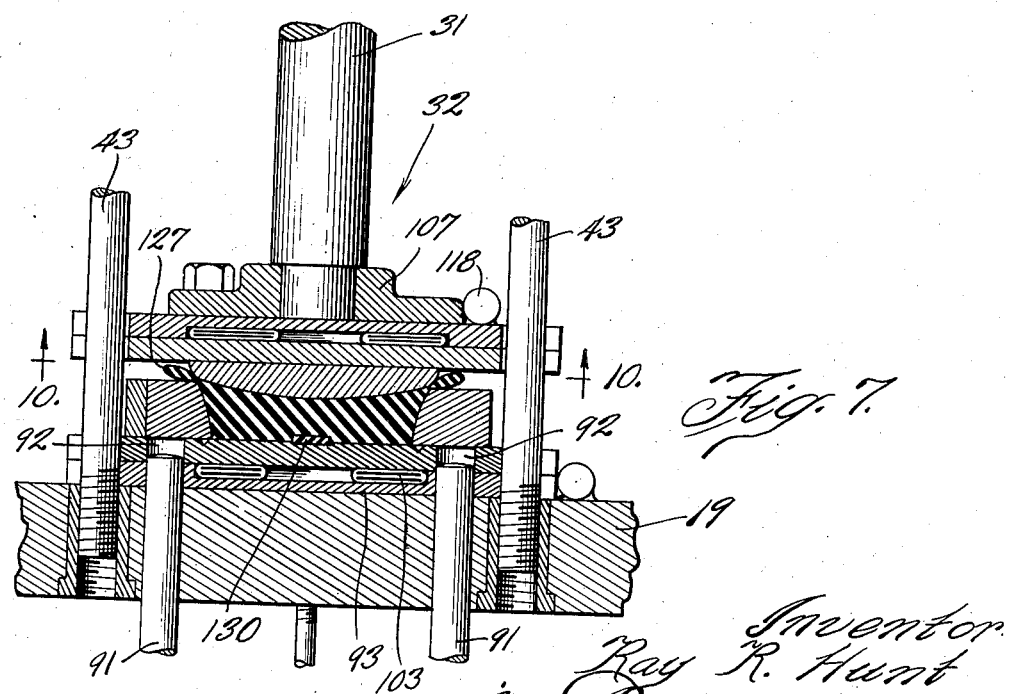
Fig. 7 is a view similar to Fig. 6 and showing the mold in the closed position with the molded stock therein.

A plurality of molding devices are mounted on the table 19 at the margin in circular series therearound and in uniformly spaced relation so that in the rotation of the table these devices are presented successively at regular intervals to the operator's position at one side of the machine, 18 of such devices being provided in the present machine. These molding devices are alike and each comprises a standard 29 which is secured to the table 19 and formed with an elevated bearing 30 for a vertically reciprocable plunger stem 31 which has a member 32, hereinafter referred to as the top mold member, on the lower end which closes down over a mating member 33 which is mounted on the table and formed with a cavity 34 in which material is compressed and shaped. The present device is designed for molding rubber heels and the cavity 34 of the member 33 is of heel shape with a flat bottom 35 against which the tread face of the heel is formed and side walls preferably flared upwardly at the side and rear as indicated at 36 and with a straight wall 37 at the front with a bevel 38 at the top and to cooperate with this mold member 33 the top mold member 32 has a convex presser head 39 on the bottom, of a marginal contour corresponding to but somewhat larger than that of the finished heel and curved from side to side as shown in Figs. 7 and 8 and from front to rear as shown in Fig. 3 and provided with a corner 40 along the front which when the presser head is closed down over the mold cavity 34 of the mold member 33 as indicated by dotted lines at 39ᵃ in Fig. 3, overlies the front wall bevel 38 of the mold member 33.

The bearing portion 30 of each standard 29 has a pair of lateral extensions 41 at the lower end which are apertured as indicated at 42 to receive the guide rods 43 which are screwed at their lower ends into corresponding threaded openings 44 in the table 19 and the guide rods 43 of each pair are disposed on opposite sides respectively of the upper and lower members 32 and 33 of the associated molding device, which said members are notched at 45 and 46 respectively to accommodate these guide rods. Side bars 47 which are secured at their lower ends to the opposite sides of the bearings 30 are secured at their upper ends to an interposed spacer 48, and the spacer 48 of each molding unit is connected by a brace 49 to a cylindrical housing 50 which is mounted concentrically on the table 19 and has a spider 51 on the upper end with center bearing 52 embracing the center shaft or spindle 18 of the machine.

Each pair of bars 47 serve as guides for an adjustable block 53 which is slidably secured therebetween and has a bearing slot 55 at the bottom between which the upper end of a toggle link 54 is pivoted on a pin 56. The lower end of the toggle link 54 is straddled by and hinged to the lower toggle links 57 by the pin 58 and the lower ends of these toggle links 57 embrace and are pivoted to the flattened upper end of the plunger stem 31 by the pin 59. The hinge connection of each toggle 54—57 is embraced by the forked end 60 of a connecting rod 61 which is secured to the hinge pin 58 and the other end of the connecting rod 61 is pivoted as at 62 to the outer end of a push rod 63 which is mounted to slide longitudinally in a radial bearing 64 of the cylindrical housing 50. There is of course a series of radial bearings 64 around the cylindrical housing, one for each molding unit of the machine and each has a push rod 63 thereon for operating the toggle of the respective molding unit and each push rod has a forked inner end within which is mounted a roller 65 which, in the rotation of the table 19 and parts mounted thereon, rides along the peripheral edge of a cam disk 66 which is fixed on the stationary center shaft or spindle 18 and is of the proper configuration to open and close the molds at the proper times.

The block 53 at the upper end of each toggle is slidable vertically along the embracing bars 47 to permit adjustment for properly closing the mold for the molding operation and also to regulate the plunger operation for proper cooperation with a temporarily raised part of the mold thereafter to effect a trimming operation on the molded article and for effecting these adjustments, a pair of opposed wedges 67 and 68 are interposed between the sliding block 53 and the spacer 48 which is at the upper ends of the bars 47. A cross arm 69 is secured to the plunger stem 31 as shown in Fig. 3 and the opposite ends, which project beyond the bars 47 are connected by springs 70 with hooks 71 which project laterally from the upper ends of the respective bars 47, all as shown in Fig. 1 so that a constant retracting tension is exerted on each stem 31, which acts through the toggle 54—57 to maintain the roller 80 against the cam 66, and at the same time, constantly holds the block 53 against the wedge 67 and the latter against the wedge 68 which is in turn held against the spacer or abutment 48 which bears the upward vertical thrust of the toggle.

The lower wedge 67 serves for manual adjustment for insuring accuracy of stroke of the plunger stem 31 for the molding and trimming operations and is controlled by a hand wheel 72 which has a stem 73 extending through an apertured lug 74 which depends from the outer end of the wedge 67 and is embraced between the hub of the hand wheel 72 and a flange or collar 75 on the stem 73, and this stem, which is threaded beyond the collar or flange 75, is engaged in a threaded opening in the block 53 so that the wedge 67 may be moved inwardly or outwardly as required by turning the hand wheel 72 in the proper direction. The hand wheel 72 may be graduated along the periphery and the wedge provided with a pointer 76 to facilitate accurate adjustment of the wedge 67.

The other wedge 68 is adjusted automatically to compensate for a lifting of a part of the mold 33 to effect a trimming operation on the article therein and to this end each wedge 68 is connected at its inner end as at 77 to the outer end of a push rod 78 which is mounted to slide longitudinally in a radial bearing 79 of the cylindrical housing 5. There is of course a series of radial bearings 79 around the cylindrical housing, one for each molding unit of the machine and each has a push rod 63 therein for operating the wedge 68 of the respective molding unit, and each push rod 78 has a forked inner end within which is mounted a roller 80 which, in the rotation of the table 19 and parts mounted thereon, rides along the peripheral edge of a cam disk 81 which is fixed on the stationary center shaft or spindle 18 and is of the proper configuration to effect the required operation of the wedges 68. For holding the rollers 80 in contact with the peripheral face of the cam disk 81 and retracting the wedges 68 at depressed or receding places in the peripheral face of the cam 81, each wedge 68 is connected by a spring 82 with the respective bearing 79 as shown in Fig. 3 so that a constant retracting tension is exerted on the wedge and the corresponding roller 80 is constantly held against and follows the peripheral configuration of the cam disk 81.

Referring now to the mold member 33, this is made of two sections, one of which, hereinafter referred to as the bottom mold section, is indicated at 83 and is in the form of a flat plate which is rigidly secured to the table 19. The other section, hereinafter referred to as the intermediate mold section, is indicated at 84 and has an opening therethrough which corresponds to the shape of the heel and constitutes the mold cavity 34, and this intermediate section 84 has pivot pins 85 projecting through vertically elongated slots 86 in pivot lugs 87 of the bottom section 83 so that the intermediate section 84 may be swung from its normal position over the bottom section 83 to the dotted line position 84ᵃ of Fig. 11 beyond the edge of the table 19 and when in the position over the bottom plate section 83, the elongated slots 86 not only permit the intermediate section 84 to close tight against the top surface of the section 83, but also permit the intermediate section 84 to be elevated slightly above the bottom plate section 83 for performance of a trimming operation on the molded heel. A dowel pin 88 is provided on the bottom section 83 to engage the opening 89 of the intermediate section 84 to insure accurate positioning of the latter section over the section 83.

Figure 6:
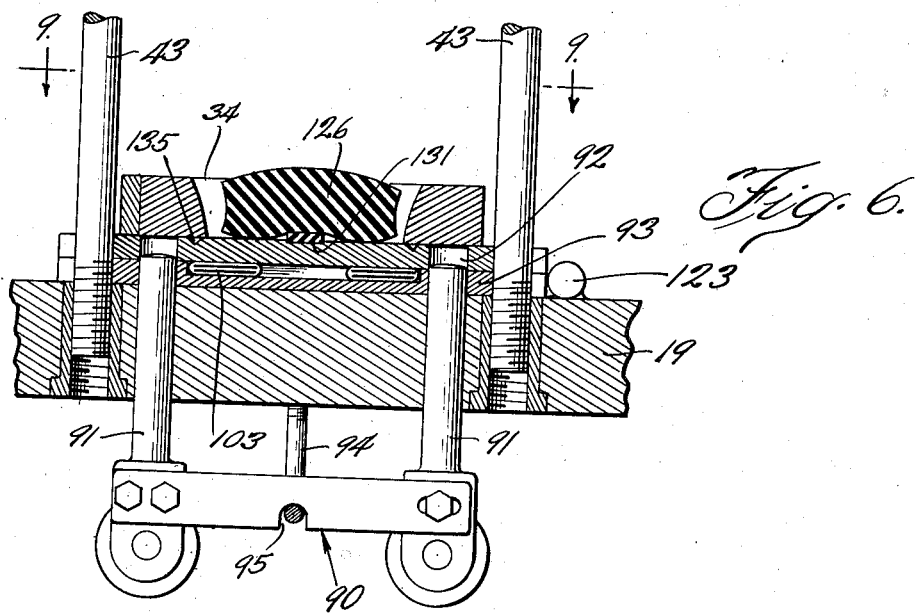
Fig. 6 is a detail vertical section through the mold on the line 6—6 of Fig. 3, and shows the stock positioned in the mold cavity preparatory to molding.

For elevating the intermediate mold section 84 above the bottom plate 83 in the trimming operation, a carriage 90 is provided under the table 19 at each molding device location and each carriage 90 has a pair of spaced vertical stems 91 which project up through the table 19 and into openings 92 of the bottom mold section 83 and its companion heating element plate 93 which is more particularly mentioned hereinafter, and the table 19 has a depending hook 94 adjacent each carriage which engages with a notch 95 of the carriage frame between the stems 91 so as to normally support the carriage in such position that the upper ends of the stems 91 are below the top surface of the bottom mold section 83 as shown in Figs. 6 and 7. Each carriage 90 is elevated to raise the intermediate mold section 84 above the bottom section 83 for trimming the molded heel just before reaching the operator's position at the front of the machine, as shown in Fig. 1, and for this purpose a standard 96 is secured to the marginal flange 16 of the machine base 15 at the proper location and has a pair of radially staggered short arcuate cam tracks 97 and 98 on the top thereof which are arranged one in advance of the other as shown in Fig. 8 and each provided with an inclined approach 99, and each carriage 90 has front and rear rollers 100 and 101 respectively suitably spaced circumferentially and radially staggered to correspond to the tracks 97 and 98 so that in the rotation of the table 19 the rollers 100 and 101 of each pair engage the respective tracks 97 and 98 simultaneously and lift the carriage 90 and project the pins 91 upwardly to temporarily elevate the intermediate mold section 84 a short distance above the bottom mold section 83 as shown in Fig. 8.

The heels which this machine is designed to produce are made from a vulcanizable rubber composition which is placed in the mold at the operator's station at the front of the machine and then compressed in the mold and vulcanized to any required extent during the rotation of the table 19 so that as each filled mold returns to the operator's station, the heel is properly vulcanized and ready for removal from the mold. To effect this vulcanization both the upper and lower mold members 32 and 33 are heated, preferably by electrical heating units 102 and 103 respectively which are located in cavities 104 and 105 respectively of these members, each of which is of composite plate form and includes a cavitied plate for the heating element, the cavitied plate of the top molding member 32 being indicated at 106 and of the bottom molding member at 93, and it is to be understood that each of these cavitied plates 106 and 93 is secured to and forms a part of the respective molding member 32 or 33 both of which are removable so that other molding members may be substituted for making heels of other forms or sizes, or for making other articles, if desired. To this end, each plunger rod 31 is provided at the lower end with a flanged head 107 to which the molding member 32 is detachably secured and the table 19 has a milled annular seat 108 for the molding members 33 which are secured therein by spanner bars 109 which overlap the edges of adjoining bottom mold sections 83 and are clamped thereagainst by screws 110 threaded into the table 19 between the molding units.

For supplying current to the heating units 102 and 103, conductors are brought down through the conduit 111 to insulated collector rings 112 and 113 on said spindle, eight rings being shown in the present machine to accommodate four lead in circuits which are employed to distribute the load. A support 114 for current control instruments is mounted at an elevation above the machine on legs 115 which are secured at their lower ends to the top spider 51 of the cylindrical housing 50 and one of these legs 115 has eight insulated brushes 116 and 117 thereon which cooperate respectively with the eight collector rings 112. Each of the four circuits is connected with a separate pair of collector rings 112 and 113, as for example each input or positive lead is connected with a separate collector ring 112 and each negative or return lead is connected with a separate collector ring 113 and each brush 117 is connected directly with a group of nine heating elements 102 or 103 of which there are four such groups composed of two groups of upper heating elements 102 and two groups of lower heating elements 103. The other brushes 116 are also connected with the respective groups of heating elements 102 or 103 so that each group of nine heating elements is supplied by a separate circuit but the conductors from these brushes 116 lead to their groups of heating elements through thermostatic controlled devices whereby the temperature of all the molding members 32 and 33 is regulated and controlled. To this end one of the upper molding members 32 has a thermostat bulb 118 secured thereto and connected to a thermostatically operated instrument 119 on the support 114 which said instrument has a dial 120 to indicate the temperature of the molding member 32 to which the bulb 118 is attached and this instrument 119 includes a pair of switches which are automatically operated simultaneously by variations in temperature at the bulb 118 to open and close the two circuits to the two groups of upper heating elements 32 as required to maintain the upper molding members 32 at the proper temperature. A knob 121 is provided for adjusting the instrument 119 to open and close the circuits at selected temperatures and as the supply of current to all the heating elements 102 is simultaneously and correspondingly controlled by the instrument 119 which is in turn controlled by the temperature of one of the molding members 32 all of the molding members are uniformly heated to and maintained at any selected temperature for which the knob 121 is set.

A similar thermostatically operated instrument 122 for controlling the temperature of the lower molding members 33 is also provided on the support and has two switches which automatically and simultaneously control the two circuits by which current is supplied to the two groups of lower heating elements 103, and one of the lower molding members 33 has a thermostat bulb 123 on the stationary plate 83 thereof connected with the instrument 122 which, like the instrument 119, has a knob 121 for regulating the temperature of the molding members 33. Details of the instruments 119 and 122 and their switches are not given as they are conventional devices and like the wiring arrangement, which is also omitted from the drawings, will be readily understood.

The machine is preferably located within an enclosing circular wall 124 which, however, is open at the front where the operator is stationed, and the toggle operating cam 66 has the peripheral face recessed at the front as at 125 so that as the molding units pass by the operator's station the toggles 54—57 are collapsed as shown in Fig. 3 and the upper molding member 32 is elevated so as to permit access to the lower molding member 33 for removing the completed heels and refilling the molds.

The rubber composition for filling the molds is preferably prepared in blanks of suitable shape and size as indicated at 126 in Fig. 6 to be placed readily in the mold cavity 34 and of sufficient thickness so that when compressed in the mold cavity the rubber will completely fill the mold and to insure such complete filling, the blanks are usually prepared with a little excess stock which under the compression extrudes out around the upper margin of the mold cavity 34 as indicated at 127 in Fig. 7 and is subsequently trimmed off of the completed heel.

The bottom plate 83 of the mold 33 may be engraved or stamped to provide a design on the bottom face of the completed heel which in the present case has a series of small bosses 128 around the margin and a trade-mark marking 129 with a red circular disk 130 in the center thereof. This circular disk is provided by embedding a circular plug of red rubber in the heel and to facilitate proper location of the plug 130 in the mold and to raise the surface thereof from the face of the heel, the bottom plate 83 of the mold member 33 is provided with a shallow circular recess 131.

In removing the finished heels from the molds the intermediate mold section is turned out to the dotted line position 84ª of Fig. 11 so that as each mold comes to the filling point the entire top surface of the bottom mold plate or section 83 is exposed and the red rubber plug 130 may be readily placed in the recess 131, this being quite desirable since the bottom mold member 33 is maintained at molding temperature and the presence of the heated section 84 on the plate 83 would make it somewhat inconvenient to place the plug 130 in the recess 131.

After the plug 130 is placed in the recess 131 and as the mold proceeds by the operator's station, the mold section 84 is turned over manually to overlie the plate 83 after which the operator places an unvulcanized rubber heel blank 126 in the mold cavity 34. The molds travel past the operator's station in the direction indicated by the arrows 132 or from right to left as you look at the machine of Fig. 1 and as each mold passes to the left of the operator's station the toggle controlling roller 65 thereof is deflected radially outward by the inclined cam face 133 of the cam 66 so as to close the mold member 32 down over the mold member 33 and beyond the incline 133 the cam face is concentric with the axis of rotation of the table 19 as indicated at 134, and maintains the mold in the closed position until the press is carried around to the opposite side of the machine and is approaching the operator's station. The mold member 32 however, is not tightly closed against the mold member 84, but is arranged, by adjustment of the wedge 67, so that there is sufficient clearance between the pressure head 39 of the mold member 32 and the top margin of the cavity 34 of the lower mold 33 so that while the rubber is thoroughly compressed it may extrude outwardly not only in the final closing movement but also thereafter as it expands under the vulcanizing heat. The compression of the rubber in the lower mold 33 tends to hold the intermediate section 84 tightly against the top face of the bottom plate 83 and prevent extrusion of rubber therebetween. As a precaution however, to minimize the displacement effect of any such extrusion, the bottom plate 83 is provided in the top face with a groove 135 which extends around and is spaced outwardly a slight distance from the lower margin of the cavity 34 so that there is a narrow margin of contact between the plate 83 and intermediate section 84 at the inner side of the groove 135 which will minimize the thickness of any extrusion of rubber at the bottom of the cavity 34, and this groove also provides a space in which any extruded rubber may accumulate without spreading outwardly therebeyond. Moreover any extruded rubber that may remain on the plate 83 may be more readily removed therefrom as it will accumulate in the groove in a strip form which makes it easy to remove.

While the molded heels may be cured to any desired extent as they progress around the machine to the removal point, depending upon the curing properties of the rubber composition and the length of time the molded heels are subjected to vulcanizing heat, it is proposed with the present machine to partially vulcanize the heels which are subsequently completely cured in any desired manner, as for example, by assembling in rubber footwear which is thereafter vulcanized sufficiently to complete the cure of the heels.

Before these partially cured heels are removed from the molds, it is desirable to trim off the extruded margin 127 around the top of the heel and to loosen the heel so it is readily removable from the mold. This trimming is accomplished by closing the presser head 39 of the top mold member 32 closely against the upper marginal edge 136 of the mold cavity 34 and against the bevel face 38 at the front thereof and as the heel and the mold parts that accomplish the trimming are in a heated condition. the edges 135 and 40 of the mold members readily press through the rubber and effect the trimming without the necessity of any special cutting facilities. However, since the rubber in the mold has been tightly compressed and resists the closing together of the mold parts for trimming, it is necessary to free the heel at the bottom of the mold so that it will yield and permit the trimming operation to be readily performed. Therefore, the toggle operating cam 66 is formed with a recess 137 to permit a slight retraction of each toggle 54—57 as the respective mold nears the trimming location and the wedge cam 81 is cut back as at 138 to permit a slight retraction of the wedge 68 of said molding unit at the same time, the conjoint operation of which results in a limited elevation of the mold member 32 above the mold member 33 and the track cams 97 and 98 are suitably located to thereupon engage the rollers 100 and 101 of the carriage 90 and through the stems 91 raise the mold section 84 above the bottom plate as shown in Fig. 8 and said section 84 is thereafter held by said cams 98 and 99 in the elevated position until the trimming operation is completed. Beyond the recess 137 the toggle operating cam 66 is formed with an elevation 139 which projects each toggle 54—57 outwardly while the respective molding unit is passing over the track cams 97 and 98 and the wedge cam 81 has a projection 140 thereon which at the same time forces the wedge 68 outwardly with the result that the top molding member 32 is closed down tight against the elevated mold section 33 by the straightening out of the toggle 54—57 supplemented by the wedging action of the wedge 68, and the extruded margin 127 is thus trimmed off from the heel in the mold. To insure proper centering of the presser head 39 with respect to the opening 34 of the mold 33, the mold member 32 is provided with a pair of depending dowel pins 161 which enter opening 162 in the mold section 84 when the mold members 32 and 33 are closed together.

In the trimming operation the heel is readily depressible in the mold cavity 34 owing to the elevated position of the mold section 84 above the plate 83 and the depression thereof which is caused by closing the molding member 32 down tight against the mold section 84 in the trimming operation, loosens the molded heel sufficiently from the surrounding walls of the mold section 84 so that the heel may more readily be removed therefrom at the delivery location.

Immediately beyond the elevation 139, the cam 66 is provided with an abrupt depression or incline 141 permitting complete retraction of each toggle 54—57 as the respective molding unit reaches the front of the machine where the operator is located and the projection 140 of the wedge cam 81 terminates at approximately the same location so that the roller 80 of each wedge assembly 68, 78 drops back against the cut back portion 142 of the cam 81 thereby retracting the respective wedge 68 which remains retracted until its mold reaches the closing position beyond the operator's station when the wedge is again projected outwardly by the cam rise 143 to supplement the toggle closure of the mold in which position the wedge is retained by the cam 81 until the mold nears the trimming location.

Preferably the cut back portion 142 of the cam 81 is a continuation of the cut back portion 138 thereof and the projection 140 is in the form of a lug which is secured by bolts 144 which are engaged in slotted openings 145 of the cam plate 81 to permit adjustment of said lug for accurately controlling the trimming operation of the wedge 68.

The retraction of the toggles 54—57 and the wedge 68 as the molds near the operator's station at the front of the machine opens the molds and elevates the mold member 32 above the mold member 33, the section 84 of which has, at the completion of the trimming operation, been released by the elevating pins 91 and restored to its normal position on the bottom plate 83, and as each open mold moves past the operator at the front of the machine, the completed heel is removed from the mold and a new red plug 130 and blank 126 are placed therein after which as the mold moves beyond the operator's position, the cam 66 operates the toggle 54—57 and the cam 81 operates the wedge 68 of the molding unit to close the mold.

Figure 4:
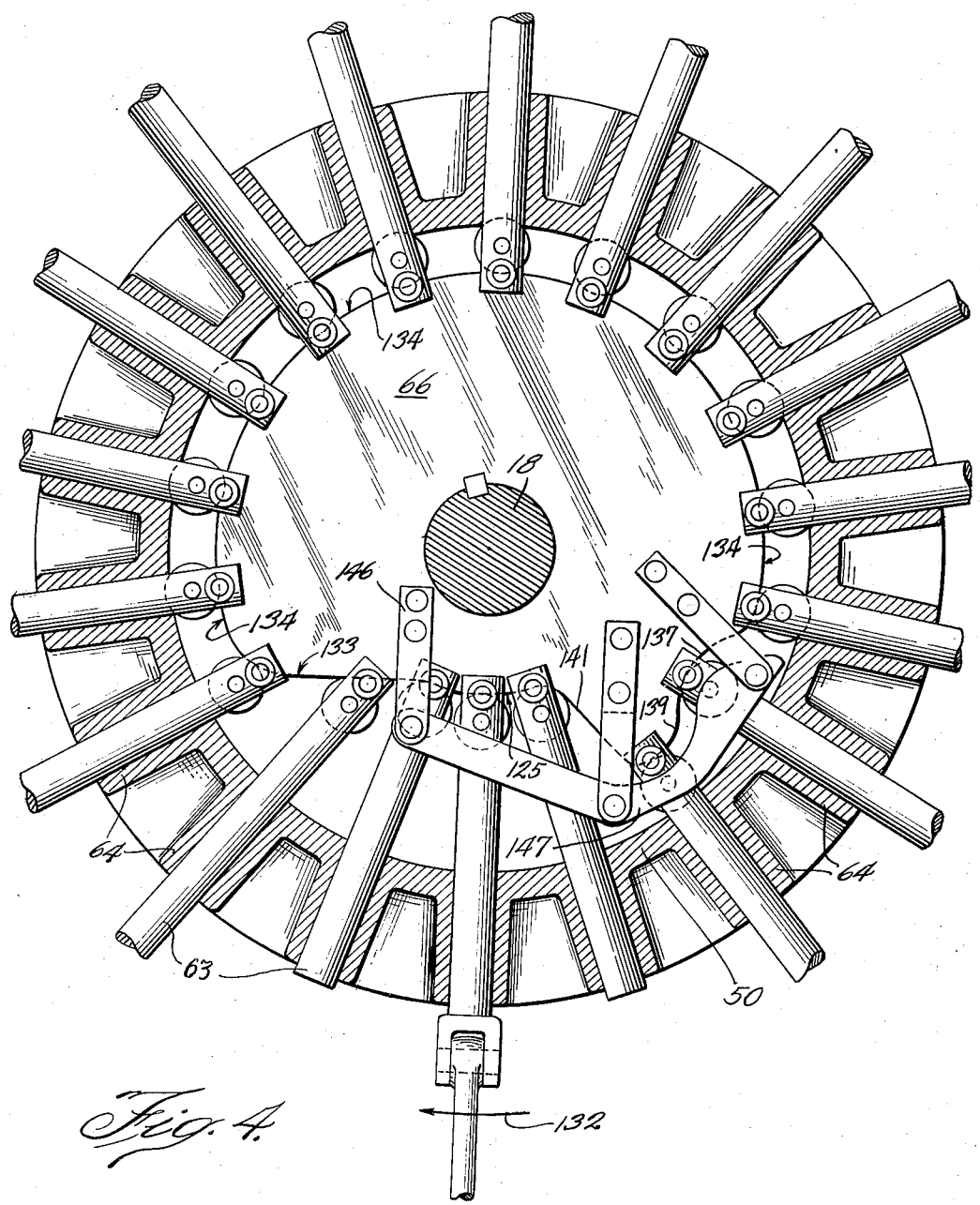
Fig. 4 is a detail section on the line 4—4 of Fig. 3 showing the toggle-joint operating cam and associated parts.
Figure 5:
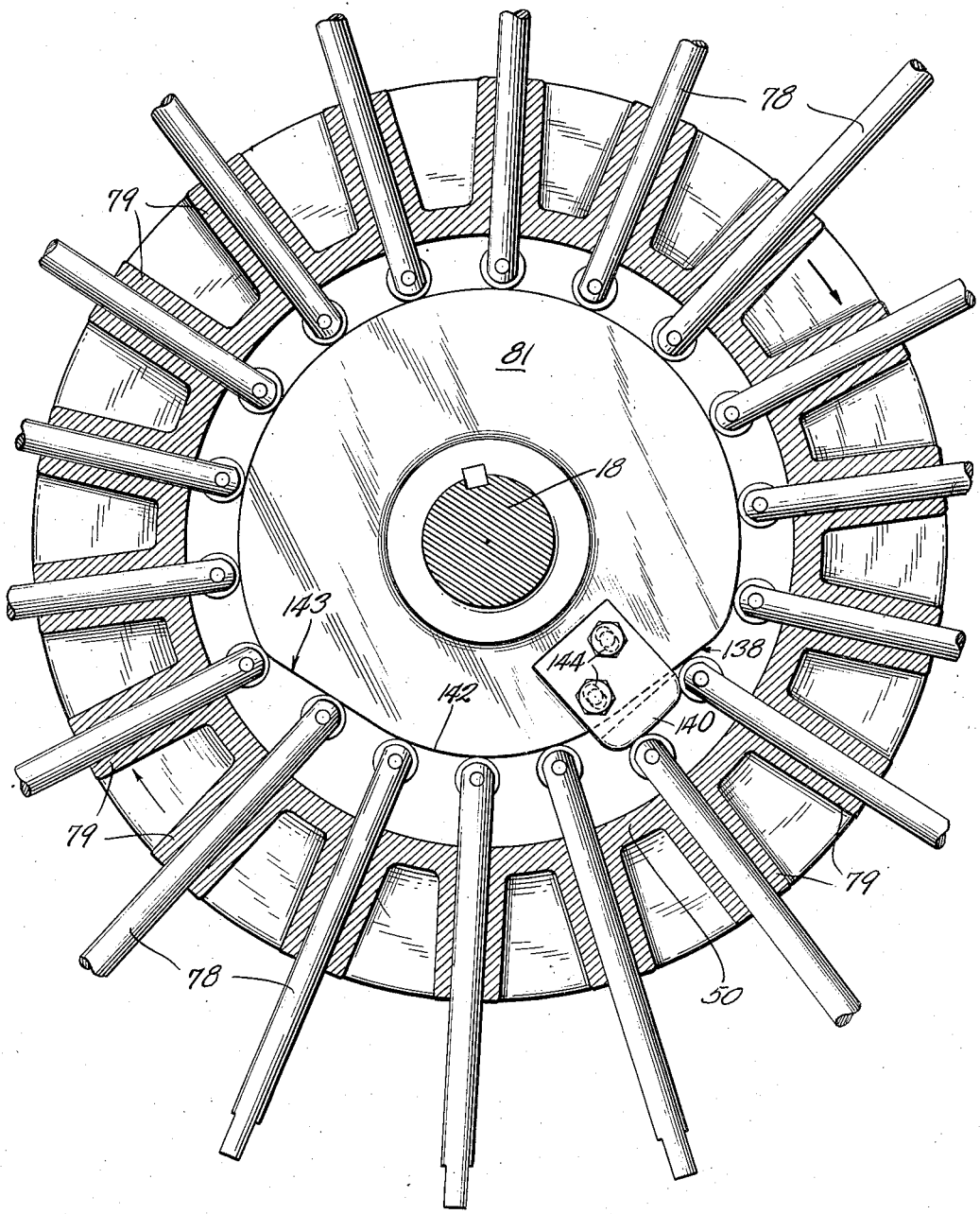
Fig. 5 is a detail section on the line 5—5 of Fig. 3 showing the wedge operating cam and associated parts.

In the closed position of the molds, the toggles 54—57 come near to a straight line position in which they do not readily retract under the tension of the spring 70 and to insure positive retraction thereof, the cam 66 has mounted thereon by means of the brackets 146 a rail 147 which extends along in front of and at an elevation above the portions 137, 139 and 141 of the cam and each toggle controlling arm 63 has a roller 148 at the inner end which as it approaches the cam recess 137 passes behind the rail 147, the inner face of which is formed to follow the configuration of the cam portions 137 and 139 as shown in Fig. 4 and insures operation of the toggles in accordance therewith and beyond the cam portion 139 this rail 147 slopes inwardly to facilitate full retraction of the toggles to open the mold at the operator's station.

Moreover in the open position of the molds the toggles 54—57 are collapsed to such an extent that it is desirable, as the molds move to the closing position beyond the operator's station, to impart an initial closing impulse thereto so as to ease the strain on the toggle connections, and for this purpose each molding device standard 29 is provided with an inwardly extending arm 149 to which the rod 150 is pivoted and this rod extends outwardly over the top of the plunger stem 31 between the toggle links 57 and at its outer end is provided with a sleeve like roller 151. A cross brace 152 is provided near the upper end of the front opening of the enclosing wall 124 and a rail 153 is secured to this brace 152 and to the adjoining wall 124 in a position to be engaged by each roller 151 as its mold passes from the operator's station and this rail is inclined so as to deflect the roller 151 and the arm 150 downwardly so as to assist the toggles 54—57 in the initial mold closing operation. Since the mold closing operation of the toggle imposes an outward thrust at the upper end of the plunger stem 31 and this outward thrust may cause a bending of the stem 31 in its bearing 30, a roller support 154 is secured to the outer face of bearing 30 and provided at the upper end with a roller 155 which bears against the outer face of the stem 31 in a manner to insure free closing movement of the stem without any bending thereof in the bearing 30.

For manipulating the pivoted mold section 84 and removing the finished heels, a tool 156 is provided with a handle 157 at one end and a hook 158 at the other and each mold section 84 preferably has a fitting 159 on one edge with an angular under cut end as shown in Figs. 9 and 11 to provide an inclined groove 160 in which the point of the tool hook 158 may be engaged as indicated in Fig. 11 to lift the mold section 84 and swing it outwardly. When this mold section has been swung outwardly the butt end of the tool handle 157 may be used to punch the heel downwardly out of the mold opening and then after the operator has placed a red rubber disk 130 in the circular recess 131 of the bottom mold plate 83, the mold section is lifted upwardly by means of the tool 156 and turned inwardly over the bottom plate 83 whereupon a rubber blank 126 is placed in the cavity 34 and the mold then proceeds beyond the operator's station to mold the closing position. Preferably the fitting 159 is at the left side of the mold section 84 and the tool 156 is held in the left hand so that the right hand of the operator is free to fill the mold, but it may be arranged otherwise if desired.

While I have shown and described my invention in a preferred form, I am aware that various changes and modifications may be made without departing from the principles of my invention, the scope of which is to be determined by the appended claims.

I claim as my invention:

1. In a molding machine of the class described, the combination of a plurality of molds which are mounted for movement from a molding zone to a discharge zone, said molds being operable to compressively mold material therein at the molding zone and comprising relatively movable outer and intermediate parts, the latter of which have openings therethrough in which the material is compressively molded at the molding zone, one of said outer parts being retractable from the intermediate part and the intermediate part being mounted for movement away from and out of alignment with the other part to a reversed position in which the aforesaid opening is exposed at opposite sides of said intermediate part.

2. The method of making molded articles which comprises shaping moldable material in a mold, then relatively moving the molded material and selected parts of the mold to free the article from the mold at one side and operating parts of the mold at the other side to trim off surplus material from the article at the latter side.

3. The method of making molded articles which comprises shaping moldable material in a mold and extruding moldable material at the edges of the molded article at one side thereof, then freeing the molded article from the mold at the opposite side and contracting the mold against extruded edges of the article at the other side so as to trim off surplus material therefrom.

4. The method of making molded articles which comprises supplying material to successive molds, advancing the molds progressively to molding and trimming zones, operating the molds at the molding zone to compressively mold the material in the mold and operating the molds at a predetermined time thereafter at the trimming zone to free the article from one side of the mold and to trim surplus stock from the other side of said article while within the mold cavity.

5. In a molding machine, a mold comprising an intermediate part having a molding cavity opening through the top and bottom thereof to receive a charge of moldable material for shaping, a bottom member closing the open bottom end of the molding cavity, a top mold member, means for elevating the intermediate member and a molded article therein to free the molded article from the bottom member, and control means for operating the said top member to compress a charge of moldable material in the molding cavity and against the bottom member to form a molded article and to extrude material from the charge and between the top and intermediate members as an incident to molding the article, and to move the molded article downwardly in the molding cavity and hold the extruded material fixed between the intermediate and top members while the intermediate member is in an elevated position for trimming said extruded material from the molded article.

6. In a molding machine of the class described, a mold mounted to travel in a circuit and including an intermediate part having a molding cavity opening through the top and bottom thereof to receive a charge of moldable material for shaping, a bottom member closing the open bottom end of the molding cavity, a top mold member, means for elevating the intermediate member and a molded article therein at a predetermined point in the travel of the mold to free the molded article from the bottom member, and control means in cooperative relation with the mold during the travel thereof for operating said top member to compress a charge of moldable material in the molding cavity and against the bottom member to form a molded article and to extrude material from the charge and between the top and intermediate members as an incident to molding the article, and to move the molded article downwardly in the molding cavity and to hold the extruded material fixed between the intermediate and top members while the intermediate member is in an elevated position for trimming said extruded material from the molded article.

7. In a molding machine, a rotatable table, a mold mounted on the table and including an intermediate part having a molding cavity opening through the top and bottom thereof to receive a charge of moldable material for shaping, a bottom member supported on the table and closing the open bottom end of the molding cavity, a top mold member, plunger means carried by and working through the table and in cooperative relation with the intermediate mold member for elevating said member and a shaped article therein, cam means disposed below the table and in the path of travel of the plunger means for lifting the plunger means and elevating the intermediate mold member, and control means in cooperative relation with the mold during its travel for operating the said top member to compress a charge of moldable material in the molding cavity and against the bottom member to form a molded article and to extrude material from the charge and between the top and intermediate members as an incident to molding the article, and to move the molded article downwardly in the molding cavity and to hold the extruded material fixed between the intermediate and top members while the intermediate member is in an elevated position for trimming said extruded material from the molded article.

8. The herein described method of making molded articles, which includes the steps of compressing a charge of moldable material into a molded shaped article and extruding excess molding material outwardly at the periphery of one face of the molded article as an incident to the shaping of the charge, relieving pressure from the opposite face of the molded article, maintaining pressure around the periphery of the molded article, holding the extruded excess moldable material fixed against movement, and moving the shaped article in the direction of the face thereof from which the pressure has been relieved and thereby removing the extruded material from the molded article.

9. The herein described method of making molded articles which includes the steps of compressing a charge of moldable material into a molded shaped article and extruding excess molding material outwardly at the periphery of the top face of the molded article as an incident to the shaping of the charge, elevating the molded article and relieving it of bottom support, maintaining pressure around the periphery of the molded article in its elevated position, holding the extruded excess material fixed against vertical movement in the elevated position of the article, and moving the shaped article downwardly while maintaining the extruded material fixed to remove the extruded material from the molded article.

10. The method of making and trimming molded articles which comprises supplying moldable material to successive molds, progressively closing the molds and shaping the material in the molds, freeing the article from one side of the mold after the shaping thereof, trimming the opposite side of the said article while within the molding cavity, and thereafter successively opening and emptying the molds.

RAY R. HUNT.